United States Patent [19]

Davis

[11] 4,066,996
[45] Jan. 3, 1978

[54] BREAKAWAY PROTECTION FOR ELECTRICALLY CONTROLLED TRAILER BRAKES

[75] Inventor: Donald L. Davis, Rockford, Ill.

[73] Assignee: Warner Electric Brake & Clutch Company, South Beloit, Ill.

[21] Appl. No.: 659,600

[22] Filed: Feb. 20, 1976

[51] Int. Cl.² .......................... B60Q 1/44; B60T 7/20
[52] U.S. Cl. .................................. 340/52 R; 188/3 R; 280/432; 303/20; 340/249; 340/275; 340/282
[58] Field of Search ................... 340/52 R, 52 D, 53, 340/248 C, 249, 275, 282; 307/10 R; 303/3, 7, 15, 20; 280/432; 188/3 R, 112

[56] References Cited

U.S. PATENT DOCUMENTS

| 2,000,999 | 5/1935 | Suchland | 340/52 R |
| 2,305,603 | 12/1942 | Cadman | 340/275 |
| 3,062,326 | 11/1962 | Jones et al. | 340/52 R |
| 3,689,717 | 9/1972 | Westenhaver | 340/52 D |
| 3,907,071 | 9/1975 | Wells | 188/3 R |

Primary Examiner—John W. Caldwell, Sr.
Assistant Examiner—Joseph E. Nowicki
Attorney, Agent, or Firm—Leydig, Voit, Osann, Mayer & Holt, Ltd.

[57] ABSTRACT

A control system of the type which provides "breakaway" safety action to energize the electrically actuatable coils of brakes in a trailer pulled by a towing vehicle, the coils being energized under a breakaway condition from an auxiliary battery carried in the trailer. The system includes a voltage threshold indicator which is connected across the auxiliary battery and the coils and which enables the driver to test the auxiliary battery and clearly determine if the battery has sufficient storage capacity to keep the coils adequately energized while load current is being drawn from the battery and supplied to the actual coils themselves — such system being characterized by the provision of a current threshold sensor which prevents the indicator from providing a "safe" signal if the excitation circuit to the coils has been interrupted or if one or more of the coils has become disconnected from the circuit.

5 Claims, 2 Drawing Figures

BREAKAWAY PROTECTION FOR ELECTRICALLY CONTROLLED TRAILER BRAKES

CROSS-REFERENCE TO A RELATED APPLICATION

This invention is an improvement over the prior invention disclosed in Philip E. Myers U.S. application Ser. No. 658,459, filed Feb. 17, 1976 and assigned to the assignee of the present invention.

BACKGROUND OF THE INVENTION

The present invention relates to breakaway protection for a trailer which is adapted to be hitched to a towing vehicle such as an automobile or truck. More particularly, the invention is adapted for use with a trailer having wheels with brakes which are engaged when associated electrical coils are energized from the towing vehicle during normal towing operations.

The trailer can sometimes break loose from the towing vehicle and run wildly down the road. To prevent this, a breakaway switch is provided between the towing vehicle and the trailer. If the trailer breaks loose, the breakaway switch is automatically rendered conductive and energizes the brake coils by means of an auxiliary battery which is carried on the trailer. But if the auxiliary battery is weak or dead and does not have sufficient storage capacity to adequately energize the coils, the brakes will not be safely applied during breakaway and the trailer thus can run wildly.

The aforementioned Myers application discloses a voltage indicator with which the driver may test the auxiliary battery to determine not only whether the battery has sufficient voltage to initially energize the brake coils but also whether the battery has adequate storage capacity to hold such voltage and keep the coils safely energized for a sustained period during breakaway. If the battery is "good," the voltage indicator provides the driver with a visual signal informing the driver that it is safe to tow the trailer. But the voltage indicator also can provide a "safe" signal when in fact the system is not safe by reason of, for example, an interruption of the excitation circuit to the brake coils or the loss of one or more coils from the circuit.

SUMMARY OF THE INVENTION

The general aim of the present invention is to improve upon the Myers invention by preventing the voltage indicator from producing a safe test signal unless all of the brake coils are properly connected in the excitation circuit and are all capable of receiving excitation current from the auxiliary battery.

A more detailed object is to detect whether all of the brake coils are capable of receiving excitation current by sensing the magnitude of the current in the excitation circuit and by disabling the voltage indicator unless the magnitude of the current through the circuit is sufficiently high to establish that all of the coils are in fact drawing current.

These and other objects and advantages of the invention will become more apparent from the following detailed description when taken in conjunction with the accompanying drawings.

DETAILED DESCRIPTION OF THE PREFERRED EMBODIMENT

Figure 1:
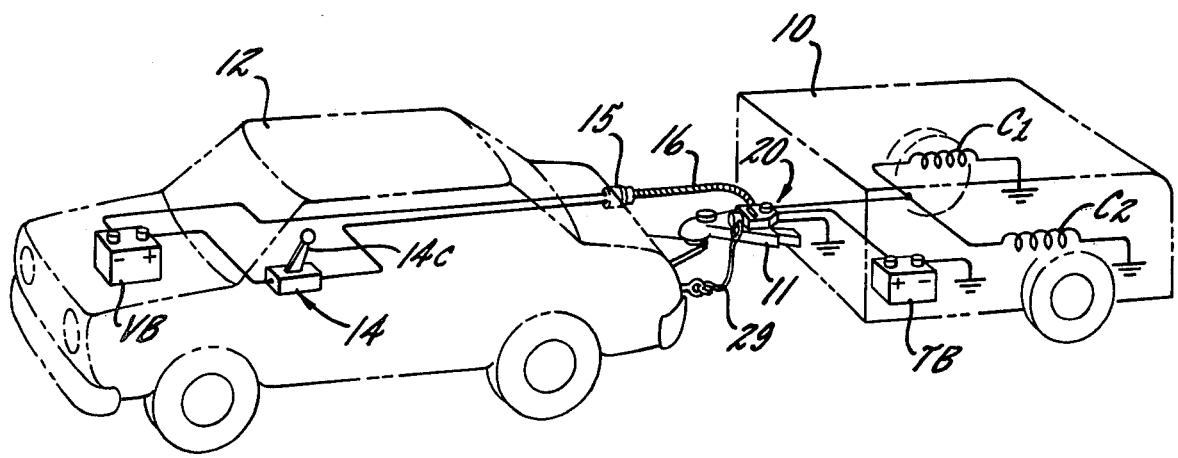
FIG. 1 is a diagrammatic perspective illustration of a trailer equipped with electrically actuatable brakes and removably hitched to a towing vehicle.

Referring to the diagrammatic perspective of FIG. 1, a trailer 10 is shown coupled by a removable hitch 11 to a towing vehicle 12. The latter may be an automobile, truck or tractor and will here be referred to as simply the vehicle. In well known and conventional fashion, the towing vehicle carries a voltage source, here a 12-volt battery VB, connected into its electrical system, and also a hand or foot controller 14 comprising a rheostat or resistor 14a (FIG. 2) along which a wiper 14b is slidable by the setting of a control lever 14c.

When the hitch 11 is hooked up, the user joins the plug and socket parts of a disengageable, multi-terminal electrical connector 15 at the rear of the vehicle 12, so that connections are estabished via a cable 16 for controllable energization of brake coils C1 and C2 on the trailer 10, as well as connections for the trailer lights and other electrical components. The connector 15 is here shown in its most simple form as having two pairs of mating disengageable terminals 15a and 15b (FIG. 2) connected to the coils by lines $L_1$ and $L_2$ which lead from the cable 16.

Because the details of the brake construction are well known and per se form no part of the invention, it will suffice to note that the wheels of the trailer 10 are equipped with brakes, preferably of the electromagnetic type, respectively associated with the coils $C_1$ and $C_2$, which are connected in parallel and thereby form a parallel combination. When energized or excited by electric current, these coils cause the wheel brakes to be actuated or engaged to produce braking torque which is preferably proportional to the magnitude of the exciting current. It should be appreciated that four or more coils can and often will be connected in parallel and that the invention to be described also can be applied to a single brake having a single coil or to several brakes controlled by only one coil.

Figure 2:
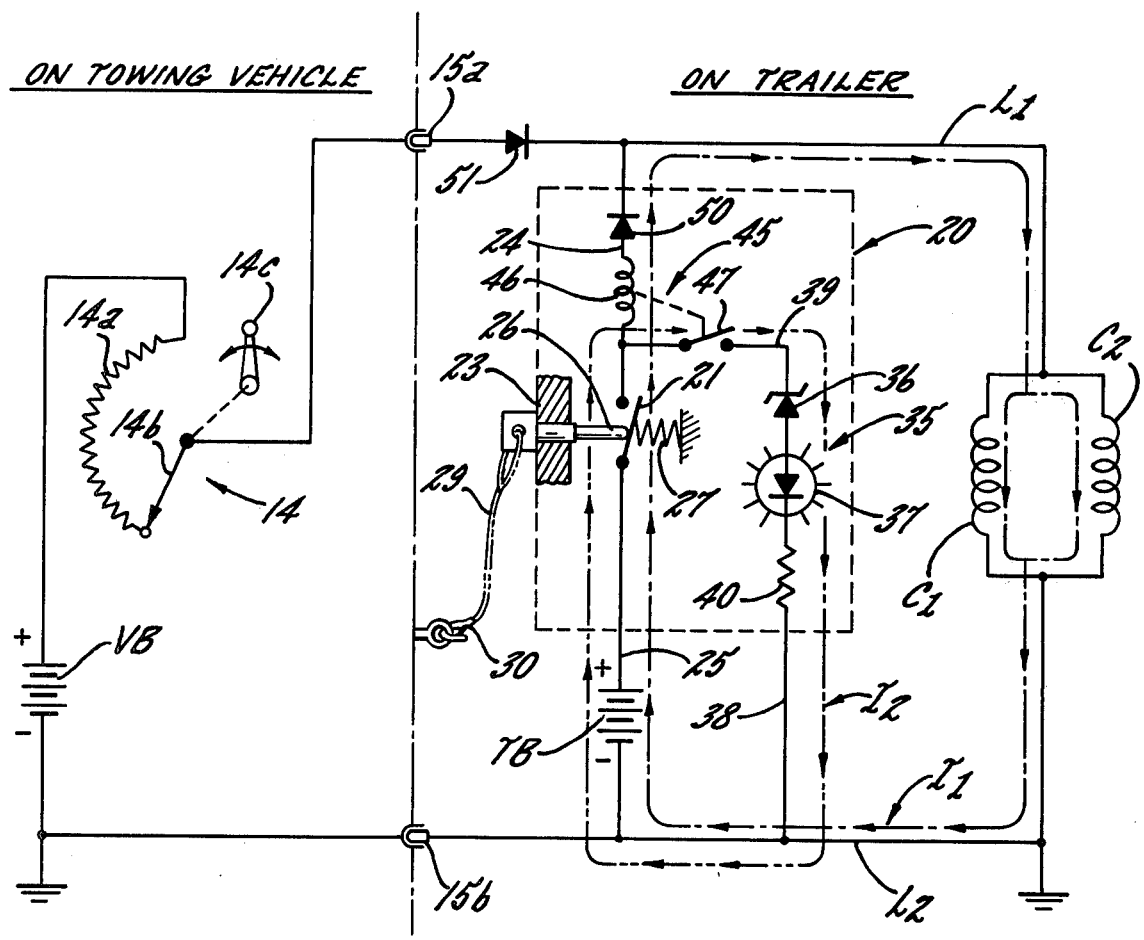
FIG. 2 is a schematic circuit diagram of a safety system constituting an exemplary embodiment of the present invention.

During normal towing operations, the coils $C_1$ and $C_2$ are variably energized by current flow through the connector 15 and the cable 16 according to the vehicle driver's setting of the lever 14c. The rheostat 14a for variably energizing the coils under normal driving conditions is shown in FIG. 2 as having one end connected to the positive terminal of the battery VB and as having the wiper 14b connected through the terminals 15a directly to the coils by the line $L_1$ and thence to the negative terminal of the battery by the line $L_2$ and the terminals 15b. While the modulated or variable energization of the brake coils forms no part of the present invention, it will be understood that by movement of the lever 14c and wiper 14b, the driver of the towing vehicle may under ordinary circumstances controllably apply the trailer brakes by varying the energizing current through the coils.

It has been a recognized danger that the trailer 10 might be pulled or "broken away" from the vehicle 12 if the hitch 11 fails on hills, rough roads or in an accidental collision. This would, of course, separate the connector 15 (or equivalently break the cable 16) to leave the brake coils $C_1$ and $C_2$ with no source of current from the vehicle battery VB and thus leave the brakes fully released. A heavy two wheel trailer (and all the more, a four, six or eight wheel trailer) may roll wildly out of control and possibly create severe damage or injury in such circumstances. Thus, it has been an accepted practice to provide an auxiliary battery TB on the trailer and to connect the auxiliary battery to the brake coils by a safety control circuit which acts to fully energize the coils from the auxiliary battery whenever the trailer, for any reason, "breaks away" from the towing vehicle.

One such safety control circuit is shown in FIG. 2 and includes a breakaway switch unit 20 having a switching device 21 which is adapted to be actuated to a given state (herein, a conductive or "closed" state) whenever the trailer 10 breaks away from the towing vehicle 12. In this instance, the switching device 21 is mounted with or otherwise associated with a first part in the form of a housing 23 carried on the hitch 11 of the trailer. One terminal of the switch 21 is connected to the line $L_1$ by a lead 24 extending from the housing 23 while the other terminal of the switching device is connected to the positive post of the auxiliary battery TB by another lead 25 extending from the housing. The negative post of the battery TB is connected to the line $L_2$ and thus that battery, the switch 21 and the parallel combination formed by the coils $C_1$ and $C_2$ are connected in a series path which conducts excitation current $I_1$ from the battery to the coils when the switch is conductive.

The breakaway switch unit 20 further includes a second part 26 (FIG. 2) herein shown as a pin, adapted to be detachably joined to the housing 23 and adapted, when so joined, to render the switch 21 non-conductive by holding the switch open against the bias of a spring 27. The pin 26 is telescoped snugly but removably into a hole in the housing 23 and is attached to a lanyard 29 which, in turn, is adapted to be connected to the towing vehicle 12 by a releasable snap hook 30.

Instructions which accompany the breakaway switch unit 20 inform the driver to keep the pin 26 plugged into the housing 23 when the trailer 10 is parked. As a result, the pin maintains the switch 21 is an open condition to avoid discharging the battery TB through the coils $C_1$ and $C_2$. The driver is further instructed to connect the lanyard 29 to the towing vehicle 12 each time the trailer is coupled to the towing vehicle. Thus, if the trailer breaks away, the pin 26 will be jerked from the housing 23 to effect automatic closing of the switch 21 and automatic energization of the coils via the auxiliary battery TB.

In such breakaway safety control systems, a serious problem can arise. That is, the auxiliary battery TB may (and often will) be neglected for long periods when the trailer 10 is stored. It thus may self-discharge, dehydrate, degrate due to aging or otherwise become defective and incapable of supplying the necessary energizing current to the brake coils $C_1$ and $C_2$. If the driver tows the trailer with a dead or ineffective auxiliary battery, there is no breakaway safety capability and thus a dangerous condition exists. The driver should, therefore, test the auxiliary battery each time the trailer is hitched to the towing vehicle and before the trailer is towed.

The present system, like that disclosed in the above-referenced Myers application, includes extremely simple apparatus for enabling the driver to test the output voltage of the auxiliary battery TB and, more importantly, to effectively test to determine whether the auxiliary battery has the capacity of maintaining a sufficiently high voltage to adequately energize the coils $C_1$ and $C_2$ when the battery is actually connected across the coils and a sustained load current is being drawn from the battery. To gain a full appreciation of the advantages of such apparatus, it should be understood that a defective but not completely dead battery may be capable of producing its full rated output voltage across its posts when the battery is not under load but that the output voltage drops sharply when a load is placed across the battery and load current is drawn therefrom. Accordingly, testing of the output voltage of the auxiliary battery TB when the latter is unloaded can provide the driver with a false indication that the battery is "good" when in fact the battery is not capable of keeping the coils acceptably energized for any appreciable length of time. Such false indications are avoided by the present testing apparatus inasmuch as the voltage of the auxiliary battery is checked while the battery is supplying excitation current to the actual load formed by the coils $C_1$ and $C_2$ and thus the driver is informed as to whether the auxiliary battery is sufficiently "strong" to keep the coils effectively energized under a breakaway condition.

More specifically, the above-mentioned testing apparatus includes a voltage threshold indicating device 35 (FIG. 2) which is adapted to be connected across the auxiliary battery TB and/or the parallel combination of coils $C_1$ and $C_2$ and which responds and produces a detectable signal only when the voltage applied to the indicating device equals or exceeds a predetermined value sufficient to keep the coils adequately energized. While various types of voltage threshold indicating devices may be utilized, the preferred device 35 comprises the series combination of (i) a Zener diode 36 and (ii) an audio or visual signal producer which is here shown as being a light-emitting diode (LED) 37. The device 35 is preferably but not necessarily incorporated in the breakaway switch unit 20 and, in the present instance, both the Zener diode 36 and the LED 37 are enclosed by the housing 23 with the LED being visible from the top of the housing by means of a transparent window (not shown) in the housing. One terminal of the LED 37 is connected to the anode terminal of the Zener diode 36 while the other terminal or the LED is in series with a current-limiting resistor 40 and is connected to the line $L_2$ by a lead 38 extending from the housing 23. The cathode terminal of the Zener diode 36 is preferably connected to the lead 24, and thus the line $L_1$, by a lead 39 within the housing 23.

With the foregoing arrangement, the voltage threshold indicating device 35 comprising the series combination of the Zener diode 36 and the LED 37 is connected substantially in parallel across the coils $C_1$ and $C_2$ and is connected in parallel across the series combination of the auxiliary battery TB and the switch 21. Thus, the voltage applied to the Zener diode corresponds substantially to the voltage across the battery TB when the switch 21 is closed and excitation current $I_1$ is drawn from the battery and supplied to the coils. As is well known, a Zener diode is a voltage sensitive breakdown device which conducts current reversely (i.e., from its cathode to its anode) only when the voltage applied to the diode equals or exceeds a predetermined threshold or breakdown value established by the inherent characteristics of the diode. Once the diode breaks down and conducts reversely, the voltage drop across the diode remains substantially constant irrespective of the magnitude of the current flow through the diode.

The Zener diode 36 which is used with a given safety control circuit is selected such that the diode will not break down and conduct reversely until the voltage applied to the diode is at least sufficient to adequately energize the coils $C_1$ and $C_2$. For example, if the coils require a minimum of 10 volts to effect safe braking, the Zener diode which is used in the circuit is one which will not conduct reversely until the voltage applied thereto reaches a threshold value of at least 10 volts.

In using the described voltage threshold indicating device 35 to test the capacity of the auxiliary battery TB, the driver —per instructions which accompany the breakaway switch unit 20—pulls the pin 26 from the housing 23 and thereby effects manual closing of the switch 21 while the trailer 10 is parked. Closure of the switch connects the coils $C_1$ and $C_2$ across the battery TB so that excitation current flows from the battery to the coils along the series path $I_1$. If the battery TB has sufficient capacity to adequately energize the coils, the voltage across the battery will remain at or above the threshold value of the Zener diode 36 and thus the latter will break down and reversely conduct current along a second series path $I_2$ from the positive post of the battery through the lead 25, the switch 21 and the leads 24 and 39, thence through the diode and the LED 37 and then back to the negative post of the battery via the lead 38 and the line $L_2$. Such current will energize the LED 37 and cause the latter to light thereby to provide the driver with a visual signal that the battery TB has sufficiently high voltage to initially energize the coils. If the LED remains lit for a predetermined minimum period of time (e.g., 10 seconds), the driver is informed that the battery has sufficient capacity to hold its voltage and adequately energize the coils even when a sustained load current is being drawn from the battery and through the coils.

In the case of a dead auxiliary battery TB, the current $I_2$ will not flow when the driver manually pulls the pin 26 and thus the LED 37 will not light. Accordingly, the lack of response of the LED informs the driver that the battery is dead. If the battery is defective but not completely dead, the initial voltage across the battery may be sufficiently high to cause the Zener diode 36 to conduct current $I_2$ to the LED when the pin is first pulled. Very shortly thereafter, however, the battery voltage will drop below the breakdown voltage of the Zener diode 36 as a result of a sustained load current being drawn from the battery and through the coils $C_1$ and $C_2$. The diode thus will cease conducting current $I_2$ and the LED will go out. Hence, if the LED lights only momentarily, the driver is warned that the auxiliary battery is not sufficiently good to hold its voltage under load and thus cannot adequately energize the coils upon breakaway.

While the safety system as described thus far possesses definite advantages over previously known systems, it still can provide the driver with a false indication that the system is safe when, in fact, the auxiliary battery TB is incapable of energizing either or both of the coils $C_1$, $C_2$. That is to say, even a "good" auxiliary battery will be incapable of energizing the coils if the circuit path $I_1$ is interrupted by, for example, breakage or disconnection of that portion of the lead 24 between the lead 39 and the line $L_1$, that portion of the line $L_1$ between the lead 24 and the coils, or that portion of the line $L_2$ between the coils and the lead 38. Breakage or disconnection of any of these named circuit portions will interrupt the circuit path $I_1$ of the coils but will not interrupt the circuit path $I_2$ of the LED 37. Accordingly, if the described circuit portions are interrupted when the driver pulls the pin 26 for testing purposes, the load presented by the coils will not be connected across the battery TB and yet the LED will light and falsely indicate that the system is safe. Moreover, the LED normally will light if the circuit path $I_1$ is continuous but if one of the coils is electrically disconnected from the path. For example, if the coil $C_1$ remains fully connected in the path $I_1$ but the coil $C_2$ for some reason becomes disconnected, the LED will light when the pin is pulled and yet the trailer will have braking capacity on only one wheel.

The present invention contemplates the unique provision of means which disables the voltage threshold indicator 35 (i.e., the Zener diode 36 and the LED 37) and prevents the indicator from providing a "safe" signal unless the excitation path $I_1$ between the auxiliary battery TB and the coils $C_1$ and $C_2$ is continuous and unless all of the coils are electrically connected into the path. While this means can take various forms, it herein comprises a current threshold sensing device 45 which interrupts the circuit path $I_2$ to the LED 37 unless the current in the coil-excitation path $I_1$ equals or exceeds a predetermined value, thereby indicating that the path $I_1$ is continuous and that both coils are connected into the path and are drawing load current from the battery TB.

The preferred current threshold sensing device 45 comprises a so-called reed relay having a sensor or coil 46 and a switching element in the form of a set of normally open contacts 47 which are controlled by the coil. The relay coil 46 is located in the path $I_1$ (but not the path $I_2$) by being connected into the lead 24 between the line $L_1$ and the lead 39 while the contacts 47 are connected into the lead 39 and thus are exclusively in the path $I_2$ and in series with the Zener diode 36 and the LED 37.

One of the characteristics of the reed relay 45 is that its coil 46 will not effect closing of its contacts 47 until the magnitude of the current through the coil reaches a predetermined threshold value. If it be assumed that each of the brake coils $C_1$ and $C_2$ draws, for example, 6 amperes of current (i.e., the two coils draw a total of 12 amperes from the battery TB), the reed relay which is selected for use in the circuit is one which has a threshold value approximately midway between 6 and 12 amperes. Now, if one of the two brake coils is disconnected from the series path $I_1$ when the driver pulls the pin 26 and closes the switch 27, the current flow in such path will only be in the neighborhood of six amperes and will be insufficient to cause the relay coil 46 to close the contacts 47. Accordingly, the contacts will remain open to prevent current from flowing in the path $I_2$ to the Zener diode 36 and the LED 37, the latter will not light, and the driver will be warned that a defective and unsafe condition exists. Also, the contacts 47 will remain open and the LED will remain unlit if the circuit path $I_1$ is in any way broken since current then will not flow to the relay coil 46. But, if the circuit path $I_1$ is continuous and both brake coils $C_1$ and $C_2$ are connected into the path, the magnitude of the current flow through the relay coil 46 will exceed the threshold value thereof so that the contacts 47 will close to complete the circuit path $I_2$ and energize the LED 37 — assuming that the voltage across the battery TB equals or exceeds the breakdown voltage of the Zener diode 36. Accordingly, the present system not only permits testing of the capacity of the battery TB but also enables checking of the integrity of the excitation circuit for the brake coils.

Preferably, an isolating diode 50 is placed in the lead 24 between the lead 39 and the line $L_1$ and is poled as shown in FIG. 2. The isolating diode prevents the flow of current from the vehicle battery VB to the Zener diode 36 and the LED 37 when the trailer 10 is hitched to the towing vehicle 12 and the connector terminals 15a and 15b are joined. Thus, the diode 50 prevents the LED from being energized and lit during normal towing of the trailer and further prevents the LED from being energized from the vehicle battery if the terminals 15a and 15b are joined when the driver pulls the pin 26 to test the auxiliary battery TB. Those familiar with the art will appreciate that the circuit shown in FIG. 2 may include other components such as a diode 51 to prevent the battery TB from discharging through the electrical system of the towing vehicle 12 if the pin 26 is pulled while the terminals 15a and 15b are joined and also may include means (not shown) to enable charging of the auxiliary battery TB from the electrical system of the towing vehicle.

I claim:

1. A safety system for use with a trailer adapted to be removably hitched to a towing vehicle and having a brake which is engaged when an associated coil is energized by a battery carried by said trailer, said safety system including first and second separable parts connectable to the trailer and the towing vehicle, respectively, a switching device rendered conductive when said first part is separated from said second part, means for connecting said switching device in a series path with said battery and said coil whereby current is normally supplied to said coil from said battery when said switching device is conductive, an indicator which produces a detectable signal when a voltage is applied thereto, and circuit connections placing said indicator electrically across at least one of said battery or said coil when said first and second parts are separated, the improvemet in said safety system comprising, means for sensing the current in said series path when said switching device is conductive and for disabling said indicator unless the magnitude of such current equals or exceeds a predetermined threshold value.

2. A safety system for use with a trailer adapted to be removably hitched to a towing vehicle and having brakes which are engaged when associated coils are supplied with excitation current from a battery carried by said trailer, said coils being electrically connected in parallel with one another and forming a parallel combination, said breakaway switch having first and second separable parts connectable to the trailer and the towing vehicle, respectively, a switching device carried by said first part and rendered conductive when said first part is separated from said second part, means for connecting said switching device in a series path with said battery and the parallel combination of said coils whereby excitation current normally is supplied to said coils when said switching device is conductive, a voltage sensitive threshold indicator for producing a detectable signal only when the voltage applied to said indicator is at or above a predetermined threshold value, and means for electrically connecting said indicator across at least one of said battery or said parallel combination whereby the voltage normally applied to said indicator when said switching device is conductive corresponds substantially to the voltage across said one of said battery or said parallel combination, the improvement in said safety system comprising, means for sensing the magnitude of the current in said series path when said switching device is conductive and for preventing voltage from being applied to said indicator unless the magnitude of such current equals or exceeds a predetermined threshold value.

3. A safety system as defined in claim 2 in which said battery, said switching device and said indicator are electrically connected in a second series path, said last-mentioned means comprising (i) a current threshold sensor connected only in said first-mentioned series path and (ii) a normally non-conductive switching element connected only in said second series path, said threshold sensor rendering said switching element conductive when the magnitude of the current in said first series path equals or exceeds said theshold value.

4. A safety system as defined in claim 2 in which said battery, said switching device and said indicator are electrically connected in a second series path, said last-mentioned means comprising a reed relay having a coil connected only in said first-mentioned series path and having normally non-conductive contacts controlled by said coil and connected only in said second series path, said coil rendering said contacts conductive when the magnitude of the current in said first-mentioned series path equals or exceeds said threshold value.

5. A breakaway switch for use with a trailer adapted to be removably hitched to a towing vehicle and having brakes which are engaged when associated coils are supplied with excitation current from a battery carried by said trailer, said coils being electrically connected in parallel with one another and forming a parallel combination, said breakaway switch including first and second separable parts which are normally connected to one another both when the trailer is hitched to and is intentionally unhitched from the towing vehicle, said first part being connected to the trailer, said second part being connected to the towing vehicle to remain with the latter and to separate from said first part when the trailer is accidentially unhitched but being manually releasable from the towing vehicle and capable of remaining connected to said first part when the trailer is intentionally unhitched, a switching device carried by said first part and physically actuated to a non-conductive state by virtue of being physically engaged by said second part when said parts are connected, said switching device being rendered conductive when said parts are separated, means for connecting said switching device in a series path with said battery and the parallel combination of said coils whereby excitation current normally is supplied to said coils when said parts are separated and said switching device is conductive, a voltage sensitive threshold indicator carried by said first part for producing a detectable signal only when the voltage applied to said indicator is at or above a predetermined threshold value, and means for electrically connecting said indicator across at least one of said battery or said parallel combination whereby the voltage normally applied to said indicator when said switching device is conductive corresponds substantially to the voltage across said one of said battery or said parallel combination, the improvement in said safety system comprising, means for sensing the magnitude of the current in said series path when said switching device is conductive and for preventing voltage from being applied to said indicator unless the magnitude of such current equals or exceeds a predetermined threshold value.

* * * * *